(12) United States Patent
Härtl et al.

(10) Patent No.: US 10,365,369 B2
(45) Date of Patent: Jul. 30, 2019

(54) LASER SCANNER AND METHOD

(71) Applicant: ZOLLER + FRÖHLICH GMBH, Wangen im Allgäu (DE)

(72) Inventors: Franz Härtl, Bad Waldsee (DE); Markus Mettenleiter, Isny/Allgäu (DE); Patrick Müller, Achberg (DE); Andreas Wagner, Wangen im Allgäu (DE)

(73) Assignee: ZOLLER + FRÖHLICH GMBH, Wangen im Allgäu (DE)

( * ) Notice: Subject to any disclaimer, the term of this patent is extended or adjusted under 35 U.S.C. 154(b) by 321 days.

(21) Appl. No.: 15/302,378

(22) PCT Filed: Apr. 10, 2015

(86) PCT No.: PCT/EP2015/057890
§ 371 (c)(1),
(2) Date: Nov. 23, 2016

(87) PCT Pub. No.: WO2015/155354
PCT Pub. Date: Oct. 15, 2015

(65) Prior Publication Data
US 2017/0067995 A1    Mar. 9, 2017

(30) Foreign Application Priority Data

Apr. 10, 2014 (DE) .......... 10 2014 105 113
Jul. 7, 2014 (DE) .......... 10 2014 109 432

(51) Int. Cl.
*G01S 17/02* (2006.01)
*G01S 17/89* (2006.01)
(Continued)

(52) U.S. Cl.
CPC ............. *G01S 17/023* (2013.01); *G01J 5/025* (2013.01); *G01J 5/0205* (2013.01); *G01J 5/047* (2013.01);
(Continued)

(58) Field of Classification Search
CPC ........ G01S 17/023; G01S 17/42; G01S 17/89; G01S 7/4817; G01S 7/497; G01J 5/089;
(Continued)

(56) References Cited

U.S. PATENT DOCUMENTS

| | | |
|---|---|---|
| 2010/0134596 A1 | 6/2010 | Becker |
| 2012/0070077 A1 | 3/2012 | Ossig et al. |

FOREIGN PATENT DOCUMENTS

| | | |
|---|---|---|
| DE | 20 2006 005 643 U1 | 7/2006 |
| DE | 10 2011 089 629 A1 | 6/2012 |
| DE | 10 2012 105 027 A1 | 1/2013 |
| DE | 20 2013 104 715 U1 | 1/2015 |
| WO | 2010/108643 A1 | 9/2010 |

OTHER PUBLICATIONS

"Hyperfocal distance," Wikipedia 2018, downloaded Nov. 23, 2018 from https://en.wikipedia.org/wiki/Hyperfocal_distance, 11 pp. (Year: 2018).*

(Continued)

*Primary Examiner* — Daniel L Murphy
(74) *Attorney, Agent, or Firm* — Oliff PLC (57) ABSTRACT

Disclosed is a laser scanner designed to include a thermographic camera. Also disclosed is a method for capturing thermographic data using a laser scanner of this type.

15 Claims, 7 Drawing Sheets

(51) Int. Cl.
*G01S 7/481* (2006.01)
*G01S 17/42* (2006.01)
*G01S 7/497* (2006.01)
*G01J 5/08* (2006.01)
*G01J 5/04* (2006.01)
*G01J 5/02* (2006.01)
*G01J 5/00* (2006.01)

(52) U.S. Cl.
CPC .............. *G01J 5/089* (2013.01); *G01J 5/0859* (2013.01); *G01J 5/0896* (2013.01); *G01S 7/4817* (2013.01); *G01S 7/497* (2013.01); *G01S 17/42* (2013.01); *G01S 17/89* (2013.01); *G01J 2005/0077* (2013.01); *G01J 2005/0081* (2013.01)

(58) Field of Classification Search
CPC ........ G01J 5/0896; G01J 5/047; G01J 5/0205; G01J 5/025; G01J 5/0859; G01J 2005/0077; G01J 2005/0081
USPC ........................................................ 356/4.01
See application file for complete search history.

(56) References Cited

OTHER PUBLICATIONS

Jun. 23, 2015 Search Report issued in International Patent Application No. PCT/EP2015/057890.
Oct. 12, 2016 International Preliminary Report on Patentability issued in International Patent Application No. PCT/EP2015/057890.
Cabrelles, M. et al., "Integration of 3D Laser Scanning, Photogrammetry and Thermography to Record Architectural Monuments", Oct. 11-15, 2009 22nd CIPA Symposium, Oct. 11, 2009, XP 055195003, pp. 1-7.
Lagüela, S. et al., "Thermographic 3D models as the foundation for Building Information Models", 11th International Conference on Quantitative InfraRed Thermography, Jun. 14, 2012, XP055194912, pp. 1-10.
Lagüela, S. et al., Calibration and verification of thermographic cameras for geometric measurements, Infrared Physics & Technology, Jan. 27, 2011, XP 028173500, vol. 54, No. 2, pp. 92-99.
Mar. 13, 2015 Office Action issued in German Patent Application No. 102014109432.8.

* cited by examiner

LASER SCANNER AND METHOD

The invention relates to a laser scanner in accordance with the preamble of claim 1 and to a method in which a laser scanner of this type is employed.

From DE 10 2012 105 027 A1 such laser scanner is known in which a camera via which the color information of a measuring object to be surveyed can be recorded is arranged at a rotating rotary head. Said camera rotates along with an optical system by which a measuring beam emitted by a transmitter can be directed to the measuring object. Said camera is a color camera so that the color information of the measuring object required for surveying can be captured without any significant color falsification and can be assigned to the 3D measuring data captured using the laser scanner so that a 3D color picture is enabled.

Laser scanners of this type are used to survey, for example, buildings, channels, interior spaces, any 3D objects, for instance exhibits of a museum etc., so that an exact set of 3D measuring data is provided.

The object underlying the invention is to provide a laser scanner by which during 3D surveying additional information about the measuring object can be captured, wherein said information is assigned to the pixels of the 3D point cloud so that such additional information is linked with the 3D scan.

This object is achieved by a laser scanner comprising the features of claim 1. The invention also includes a method that enables thermographic data to be captured using a laser scanner of this type.

Advantageous further developments of the laser scanner and the method are the subject of the subclaims.

The laser scanner according to the invention comprises a rotary head which is rotatably held on a housing of the laser scanner which in turn is rotatable about an axis of rotation. In the rotary head measuring optics, especially laser optics, are arranged by which a measuring beam emitted by a transmitter is directed to a measuring object or a beam reflected by the latter is directed to a receiver. The transmitter and the receiver preferably form part of the laser scanner. In this way, by pivoting the laser scanner about the especially vertical axis of rotation and rotating the rotary head about its especially horizontal axis a 3D scan of the measuring object can be generated. In accordance with the invention, the laser scanner additionally includes means by which thermographic data of the measuring object to be surveyed can be captured. Said means preferably is a thermographic camera. Said 3D thermographic data then may be assigned to the measured points/pixels of the 3D scan using appropriate means so that as a result a 3D scan (point cloud of the measuring object) having linked thermographic data is provided. Said means for assigning is especially part of the laser scanner.

Correspondingly, the method according to the invention provides to scan the measuring object by the laser scanner in an especially first step and in this way to obtain a point cloud of the measuring object (3D scan). For capturing the thermographic data means for capturing such thermographic data, preferably a thermographic camera, is attached to the laser scanner, preferably to the housing thereof or to a carrier of the laser scanner, so that a spherical 360° thermographic picture of the measuring object is obtained by stepwise pivoting the laser scanner about its especially vertical axis of rotation and by stepwise adjusting the viewing direction of the thermographic camera, especially by rotating the same about its especially horizontal axis. It turns out to be advantageous for an accuracy of the laser scanner to attach and, respectively, support the thermographic camera on the carrier as compared to the support thereof on the housing. Said 3D thermographic data then are linked with the pixels of the 3D scan in order to obtain, on the one hand, the geometric data and, on the other hand, the thermographic data in a 3D representation.

Said thermographic 3D representation provided by the laser scanner and by the method allows a more precise evaluation of thermographic data than would be permitted by the pure 2D thermographic data. In addition, navigation is enabled within the 3D representation. In particular, in addition to the representation of the temperature distribution, exact geometric dimensions of temperature ranges can be determined, i.e. in the 3D representation exact spatial measurements can be carried out which on the basis of 2D thermographic data could be assessed only inaccurately or would be impossible.

The means for capturing thermographic data, especially the thermographic camera, can produce preferably thermographic pictures as thermographic data.

The mounting of the means for capturing thermographic data, preferably of the thermographic camera, on the laser scanner can be carried out by means of a platform by which said means can be pivoted about an axis extending transversely to the axis of rotation of the housing. In other words, the viewing direction of the thermographic camera can be varied in the vertical direction (vertically to the base).

The pivoting angle/the viewing direction can be adjusted step by step. Preferably a step size can be adjusted.

In accordance with the invention, the means for capturing thermographic data, especially the thermographic camera and the platform, are preferred to be jointly controllable by a controller or control unit of the laser scanner and to be supplied with power.

The thermographic camera preferably is an infrared camera.

Prior to the actual surveying, the thermographic camera or the means for capturing thermographic data has to be calibrated, wherein according to the invention internal calibration and external calibration are performed.

In addition, the measuring result can be improved when a lens of the thermographic camera is adjusted to the hyperfocal distance. Then an as large distance range as possible can be covered by the thermographic camera. For this purpose, preferably a thermographically clearly visible test object, for instance a specific "Siemens star", is used which is visible to the thermographic camera so that the latter can be optimally focused.

The internal calibration, for example the capturing of the radial distortion or the capturing of the second principal point, may be performed using a defined calibrating object which is thermographically visible. Said calibrating object may be, for example, a predetermined pattern, preferably a checker-board pattern or the like, which can be captured using the thermographic camera. By evaluating said pattern parameters of the internal calibration can be determined especially by standard algorithms.

The external calibration is performed, for example, for determining the position of the optical axis of the thermographic camera relative to the 3D scanner center. Preferably it is performed for determining the displacement and/or turning of the thermographic camera relative to the coordinate system of the laser scanner. Accordingly, at the measuring object or in the area to be surveyed target boards are arranged which are visible both in the thermographic picture and in the 3D scan so that an offset between the optical axes of the scanner and the thermographic camera can be calculated and therefrom required transformations during image evaluation can be determined. For this purpose, in the two data sets of the 3D scan and the thermographic camera centers are established and, based on the offset thereof, the required transformations are established by algorithms.

In a preferred further development the laser scanner includes a controller or control unit by which at least the calibration of the means for capturing thermographic data, especially those of the thermographic camera, is performed in an automated manner. The controller or control unit preferably is the one via which the means for capturing thermographic data, especially the thermographic camera, and the platform are jointly controllable and are supplied with power, where necessary.

In a preferred further development the method comprises a step of correcting distortion of the thermographic data of the measuring object and a step of merging the thermographic data into a panoramic picture.

Structural, material or any other inhomogeneity of the measuring object can be perfectly detected using the laser scanner, when the method in a preferred development includes, prior to the step of recording thermographic data, a step of especially non-stationary heating or cooling the measuring object at least in portions.

In a preferred further development of the method, the step of recording thermographic data is taken from plural recording locations, wherefrom a point cloud being sufficiently poor in gaps and consisting of plural scans including assigned thermographic data is resulting.

In a preferred further development the method comprises a step of establishing a damaged spot and/or humid spot at or in a structure of the measuring object, especially of a building worth being protected (Cultural Heritage) in dependence on the 3D scan and the assigned thermographic data. In this step, too, the situation that damaged spots and/or humid spots may exhibit a thermal radiation behavior different from their environment may be made use of.

Further possible applications of the laser scanner or further steps of the method are for example: detecting deformations of buildings such as a bridge; monitoring electric installations for localizing excessively high currents or short-circuits or determining thermal bridges at buildings, especially for analyzing and enhancing the energy efficiency.

It is of advantage that the laser scanner works in a non-destructive manner, thus causing the measuring operation not to influence or to merely negligibly influence the measuring result.

During the step of recording thermographic data during which the laser scanner is pivoted about its axis of rotation and the thermographic camera is pivoted about its axis, preferably a plurality of, preferably from about 20 to 40, especially preferred 32 individual pictures are taken which include thermal radiation of the recorded measuring object(s) for the pixels of the 3D scan.

As soon as the required especially optical and geometric parameters of the thermographic camera are established by means of the afore-mentioned calibrations, the captured thermographic individual pictures can be distortion-corrected in a preferred step of the method and can be merged into a panoramic picture.

In a preferred further development, the temperature in each pixel can be established via a step of establishing the temperature by a material-dependent degree of emission from the thermal radiation.

The step of assigning the thermographic data to the 3D data of the measuring object is preferably taken by linking the thermographic data in a partly transparent manner with the 3D data, thus causing edges and details of the measuring object(s) to be better recognizable.

Hereinafter the invention shall be illustrated in detail by way of an embodiment, in which:

FIG. 9 shows a different 3D view of the point cloud including assigned thermographic data according to FIG. 8.

Figure 1:
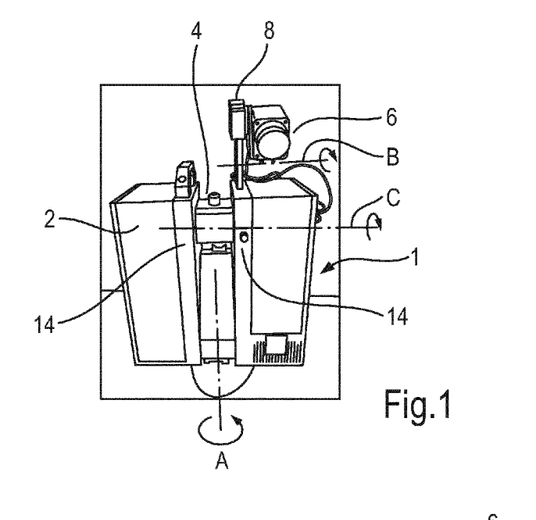
FIG. 1 shows an individual representation of a laser scanner according to the invention.

FIG. 1 illustrates a front view of a laser scanner 1 according to the invention having the structure as explained in the beginning. Accordingly, a rotary head 4 including the measuring optics is supported on a carrier 14 carrying a housing 2 of the laser scanner 1. The rotary head 4 is rotatable about a horizontal axis C (view according to FIG. 1). The carrier including the housing 2 and the rotary head 4 is pivoting about a vertical axis of rotation A.

On the carrier 14 also the means for capturing thermographic data is supported. In the concrete case, this is an infrared camera 6 (thermographic camera) that is supported to be pivoting about an axis B on a platform 8 which in turn is mounted on the carrier 14.

Figure 2:
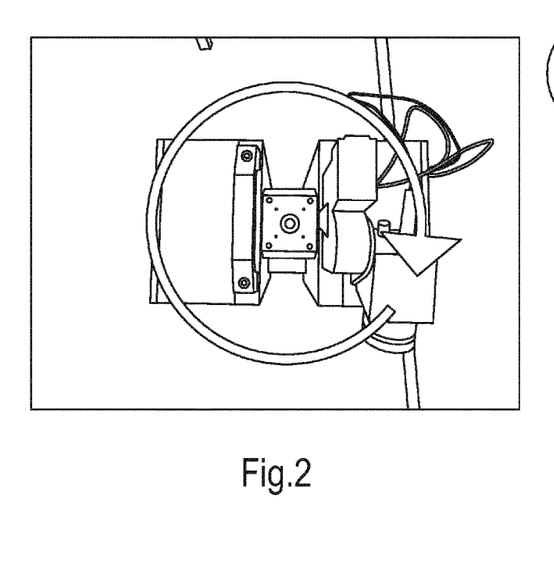
FIG. 2 shows a top view onto the laser scanner which is pivoting about its axis of rotation for measuring the thermographic data.

For surveying the carrier 14 may be pivoted stepwise with the housing 2, the rotary head 4 and the infrared camera 6 about the axis of rotation A. Such stepwise pivoting is illustrated in FIG. 2. That is to say, during a measuring operation for capturing the thermographic data the laser scanner 1, more exactly speaking the carrier 14 including the housing 2 and the rotary head 4, is pivoted about the axis of rotation A extending perpendicularly to the plane of projection in FIG. 2 (cf. arrow direction). The pivoting may take place in both directions.

Figure 3:
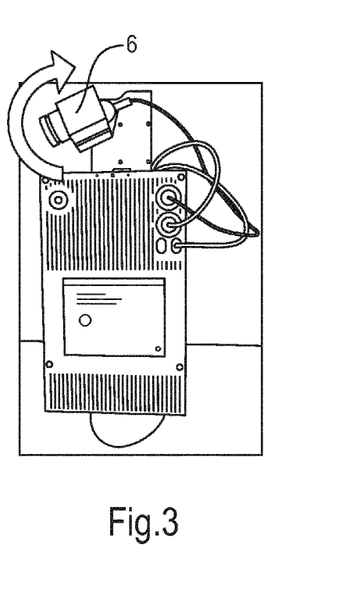
FIG. 3 shows a side view of the laser scanner in which the pivoting capability of the thermographic camera about its axis is illustrated.

In order to obtain a spherical thermal picture the viewing direction of the infrared camera 6 according to FIG. 3 is adjusted about the axis B there extending perpendicularly to the plane of projection (FIG. 3)—said stepwise adjustment/pivoting is illustrated by an arrow in FIG. 3. Also this adjustment may be performed in both directions. The axis B extends transversely to the axis A, wherein both axes are arranged to be offset against each other. The stepwise pivoting of the infrared camera 6 and the actual laser scanner 1 (carrier 14, housing 2, rotary head 4 including measuring optics) is preferably controlled using the controller of the laser scanner 1.

Hence a spherical 360° panoramic picture which is supplemented by and, respectively, assigned to the 3D scanning data is automatically generated using the motorized thermographic camera/infrared camera 6 so as to obtain a thermal picture, especially a thermal panoramic picture. In this way, a temperature or information from which the temperature can be derived can be assigned to each measuring point of a 3D scan. As a matter of course, also smaller spherical sections may be scanned and thermographically captured. Especially from the basis required by the laser scanner 1 and its geometric dimensions already a small spherical section close to the bottom is resulting which cannot be scanned/thermographically captured. In order to avoid this fact, different concepts of supporting the rotary head and/or the thermographic camera are imaginable.

For being able to generate the 360° picture numerous individual pictures into different cardinal directions have to be taken. For this purpose, the illustrated platform 8 is provided which receives a commercially available infrared camera 6 and is adapted to move the same into the vertical direction (FIG. 3). Said platform 8 including the infrared camera 6 is mounted on the actual laser scanner 1 (carrier 14). By the additional horizontal movement of rotation of the laser scanner 1 (FIG. 2) any viewing direction may then be automatically taken.

During the recording process the 3D scanner or, resp., laser scanner 1 rotates stepwise about the axis of rotation A (FIG. 2). At each position the infrared camera 6 takes an individual picture. After complete rotation about 360° the infrared camera 6 is rotated via the platform 8 about the axis B vertically by one step upwards (FIG. 3). As a consequence, the 3D scanner 1 again rotates about its axis of rotation A and at each intermediate position the infrared camera 6 takes an individual picture.

This process is repeated until also the zenith above the scanner or, resp., laser scanner 1 is covered with thermographic pictures.

As a matter of course, alternatively also at first the viewing direction can be changed via the platform 8 in a first angular position of the housing 2 so that initially a vertical surveying is performed. Consequently, the laser scanner 1 then can be pivoted by one step about the axis A and after that the vertical surveying can be repeated. This process accordingly will be repeated again until the entire space is surveyed and, respectively, the thermographic data thereof are captured.

Both the platform 8 and the infrared camera 6 are connected to the control of the laser scanner 1 via cables or the like. Thus both the power supply and the communication are ensured via the central controller of the laser scanner 1. The entire recording process including the control of the infrared camera 6 and of the motorized platform 8 required for this purpose is carried out autonomously by the laser scanner 1.

Since a configuration of the lens and the camera includes individual optical geometric properties (focal length, radial distortion etc.), each camera lens system is adjusted and calibrated individually at works. This is performed by means of calibrating techniques according to the invention which have to be and especially are adapted to the requirements of the thermographic camera 6.

In one step the lens of the infrared camera 6 and, respectively, thermographic camera 6 is adjusted to the hyper-focal distance so that an as large distance range as possible can be covered by the thermographic camera 6. For this purpose, preferably a thermographically clearly visible test object, for example a specific "Siemens star", is used which is visible to the thermographic camera 6 so that the latter can be optimally focused.

For calibrating the internal calibrating parameters of the thermographic camera 6, for example the radial distortion, the second principal point etc., a specific calibrating object, preferably a checkerboard pattern is used which is equally thermographically visible. The said internal parameters can be determined by evaluating this pattern by means of standard algorithms.

For external calibration (shifting/turning the thermographic camera 6 relative to the coordinate system of the laser scanner 1) preferably specific target boards are used the centers of which have to be visible both in the thermal picture and in the 3D picture data. By specific algorithms then in both data sets (thermographic data, 3D scanning data) the centers are determined and based on the offsets thereof the required transformations (external calibration) are determined.

In the illustrated embodiment the afore-mentioned calibrations are performed automatically via said controller or control unit (not shown) of the laser scanner 1.

As soon as all optical and geometric parameters of the thermographic camera 6 are established by means of such calibration, the detected individual pictures may be distortion-corrected and combined/merged into a panoramic picture. During the entire picture-taking process (pivoting about the axis of rotation A and pivoting about the axis B) for example about 32 pictures are collected which contain the thermal radiation of the recorded objects in each pixel of the 3D scan. Then the temperature in each pixel can be determined by means of a material-dependent degree of emission.

Said thermal or thermographic data may then be linked with the 3D data, which is preferably performed in a partly transparent manner so as to show edges and details more clearly.

Figure 4:
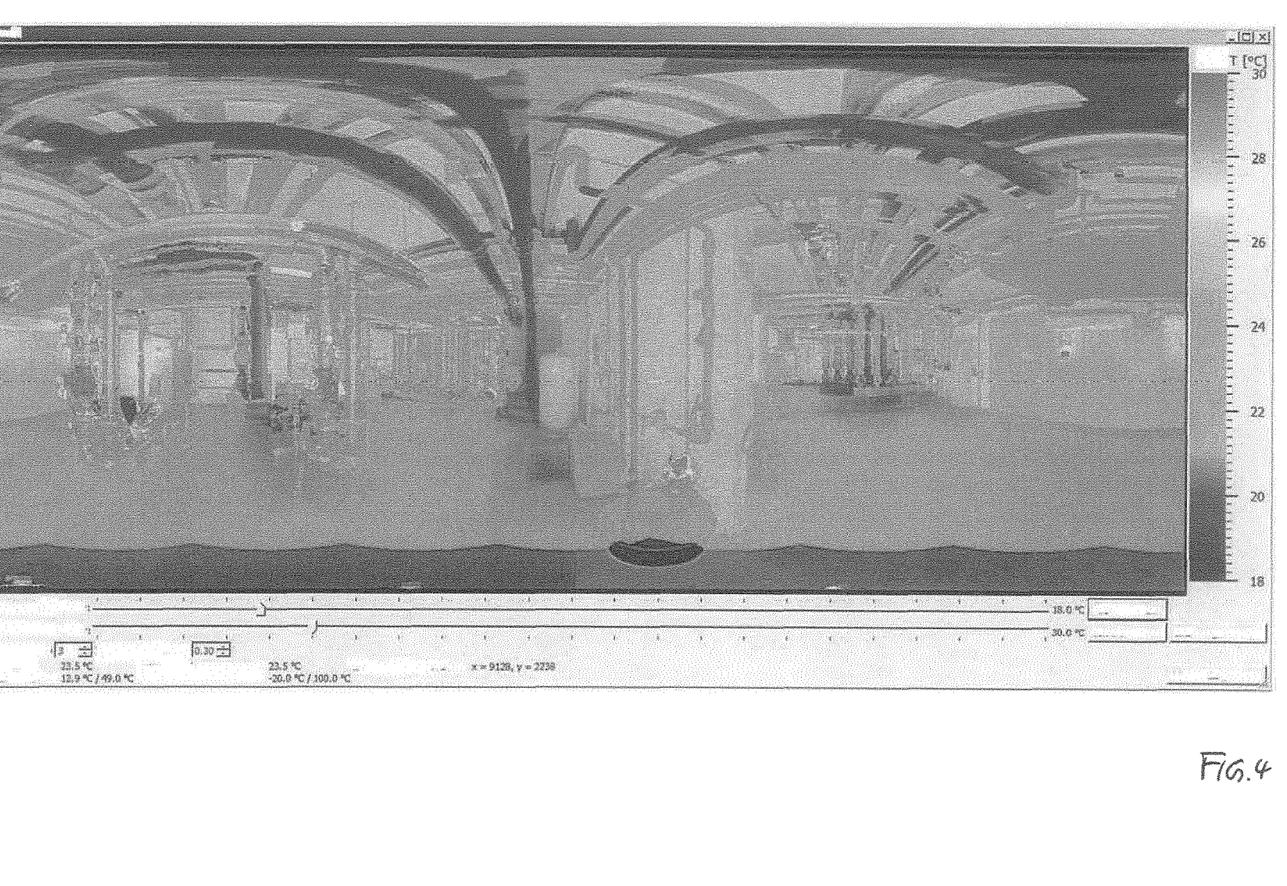
FIG. 4 shows a completed thermal panoramic picture.

FIG. 4 illustrates an example of such completed thermal panoramic picture in a user interface of the means for assigning the thermographic data to pixels of the 3D scan. There is shown a machine room comprising pumps, containers, pipes and switch cabinets. On the right in FIG. 4 a temperature/color scale is shown by which the temperature of individual areas of the thermal panoramic picture can be substantially estimated by a user. The interface will assist the user in analyzing thermal panoramic pictures and 3D views of point clouds including assigned thermographic data. In this way, via the interface inter glia the minimum and maximum temperatures in the thermal panoramic picture or in the 3D scan are output, the temperature is indicated below the cursor guided by the user, the degree of transparency of the thermographic data is selected, the representation is limited to a desired temperature interval or is switched between the thermal panoramic picture and the 3D view of the scanned point cloud including assigned thermographic data.

Figure 5:
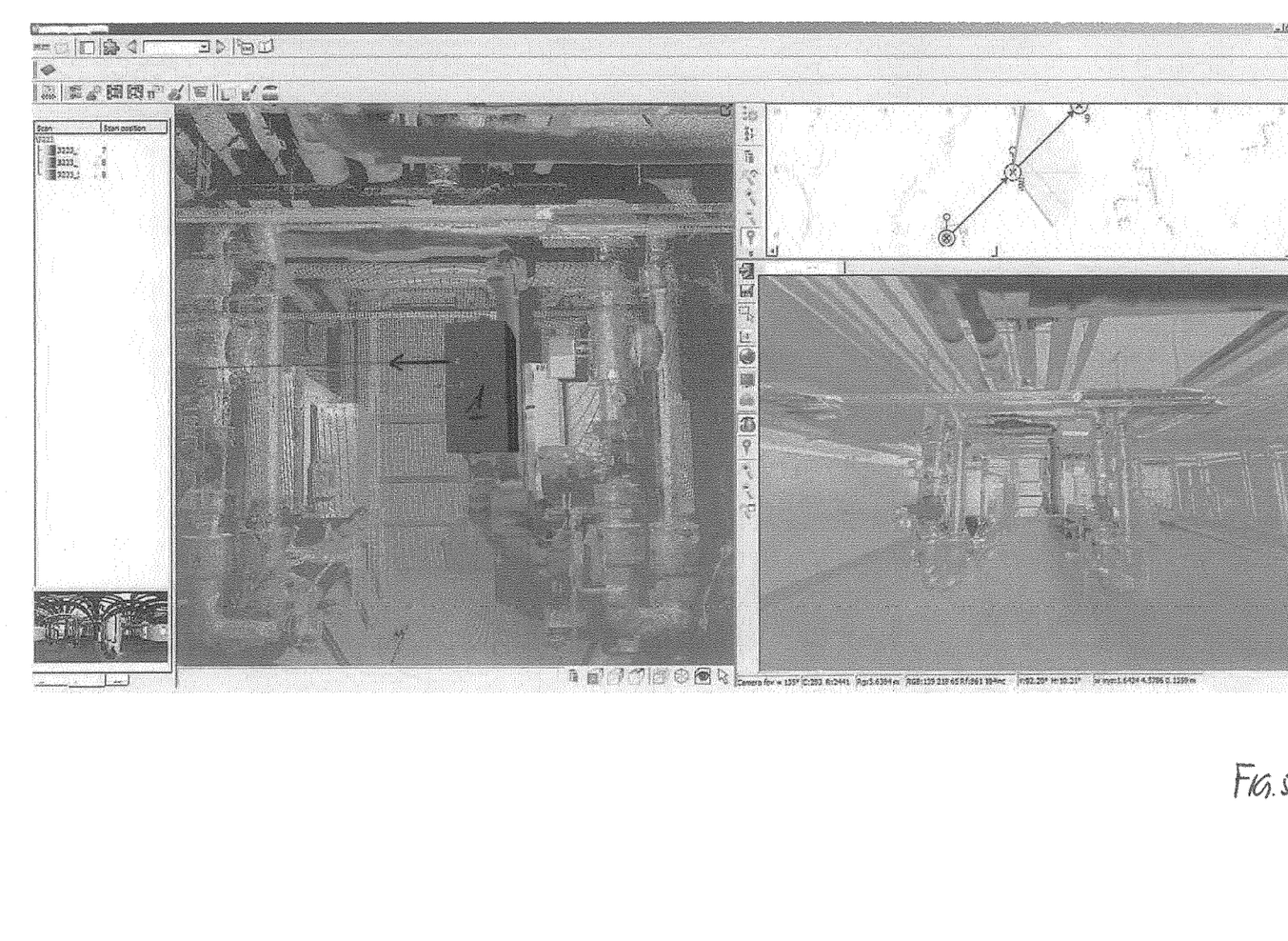
FIG. 5 shows a 3D view of a point cloud including assigned thermographic data and an assigned completed thermal panoramic picture.

On the right in FIG. 5 a section of the completed thermal panoramic picture according to FIG. 4 is illustrated. On the left in FIG. 5 one out of plural possible user-selectable 3D views of the scanned point cloud including assigned thermographic data is illustrated. Accordingly, the thermographic data originate from the completed thermal panoramic picture. In the 3D view the laser scanner 1 is evident as a cuboid. On the top right of FIG. 5 a survey of locations 12 of the laser scanner 1 during the scanning operation is shown.

In the 3D view according to FIG. 5, domains in which no pixels are evident and which are moreover unstructured in terms of color stand out. These are domains which were not adapted to be scanned by the rotary head 4 and/or the thermographic camera 6, as they were shaded by other objects during the scanning and, resp., capturing operation. As the laser scanner 1 performs scanning/capturing on the basis on different locations and assigns the consequently plural thermal panoramic pictures to the plural point clouds, these domains, too, can be integrated in the 3D point cloud including assigned thermographic data.

Figure 6:
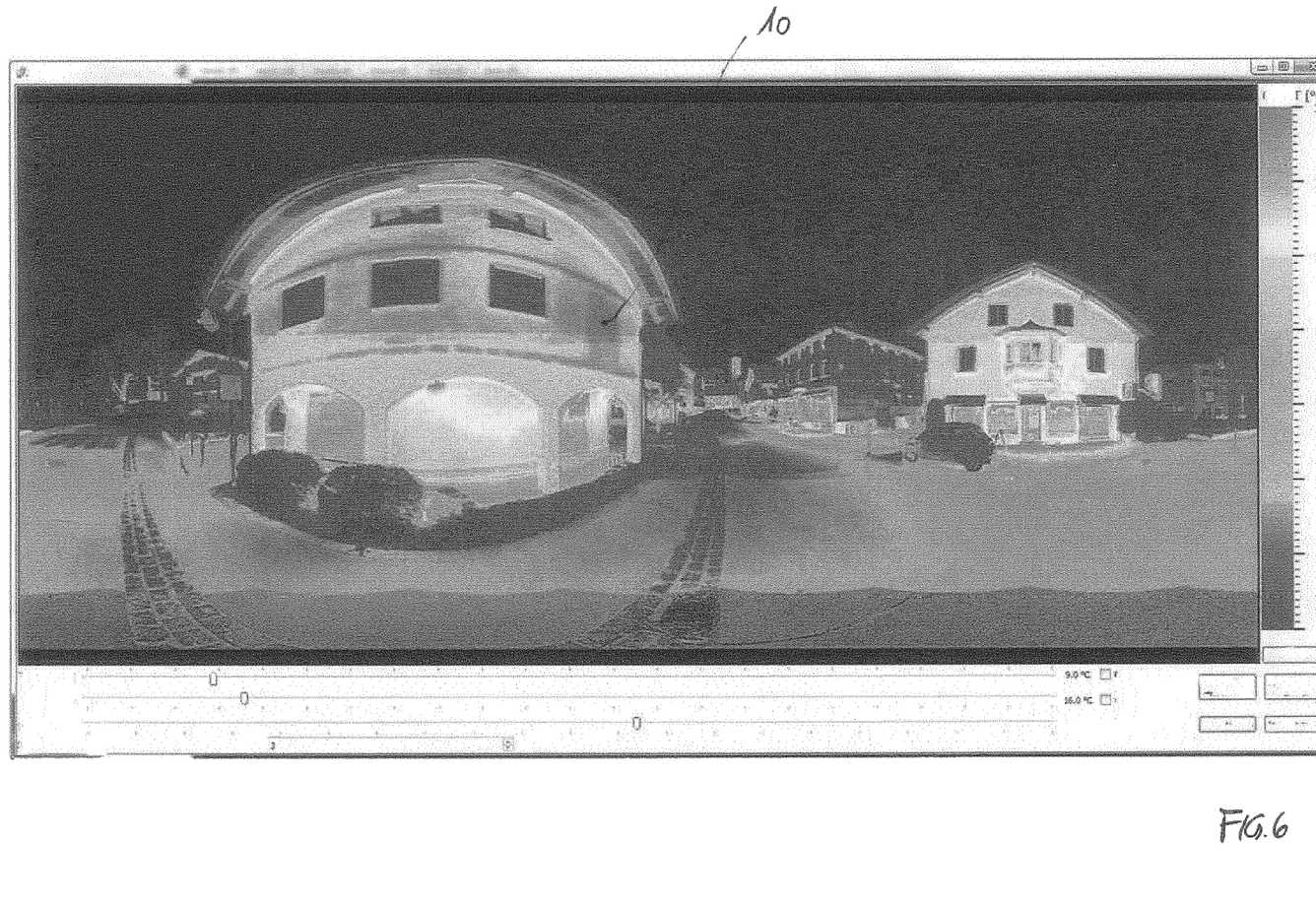
FIG. 6 shows a completed thermal panoramic picture of a row of houses for analyzing the heat insulation.
Figure 7:
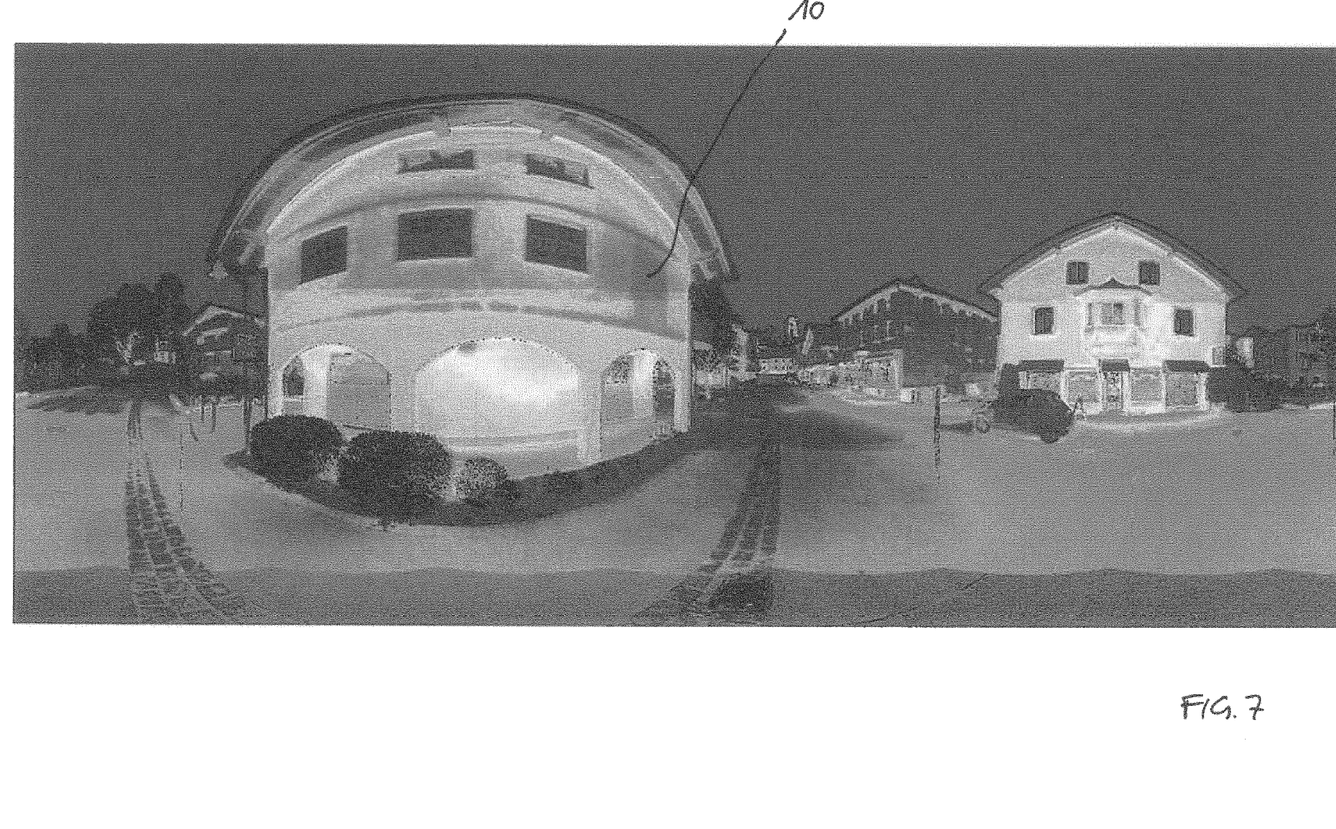
FIG. 7 shows the thermal panoramic picture according to FIG. 6 with the sky being separated.

FIG. 6 illustrates an example of a completed thermal panoramic picture of a row of houses (on the left in FIG. 6) for analyzing the heat insulation thereof. In this case, too, reddish areas again show a comparatively high temperature and poor heat insulation. It is striking with this picture that the façade of the house probably shows a structural inhomogeneity 10. At this point the highly resolving pixels of the 3D point cloud do not show any edges or other contours. However, the thermographic data indicate that here the radiation behavior of the façade is changed. It can be assumed from the shape of the inhomogeneity 10 that here an opening of the façade, for example a door, was walled up and plastered in a way invisible to human eyes. In this case, too, an area of absolutely homogenous color gradient stands out, which is the sky. For a better comprehension of the panoramic picture the sky is separated and colored in dark red in FIG. 6.

Figure 8:
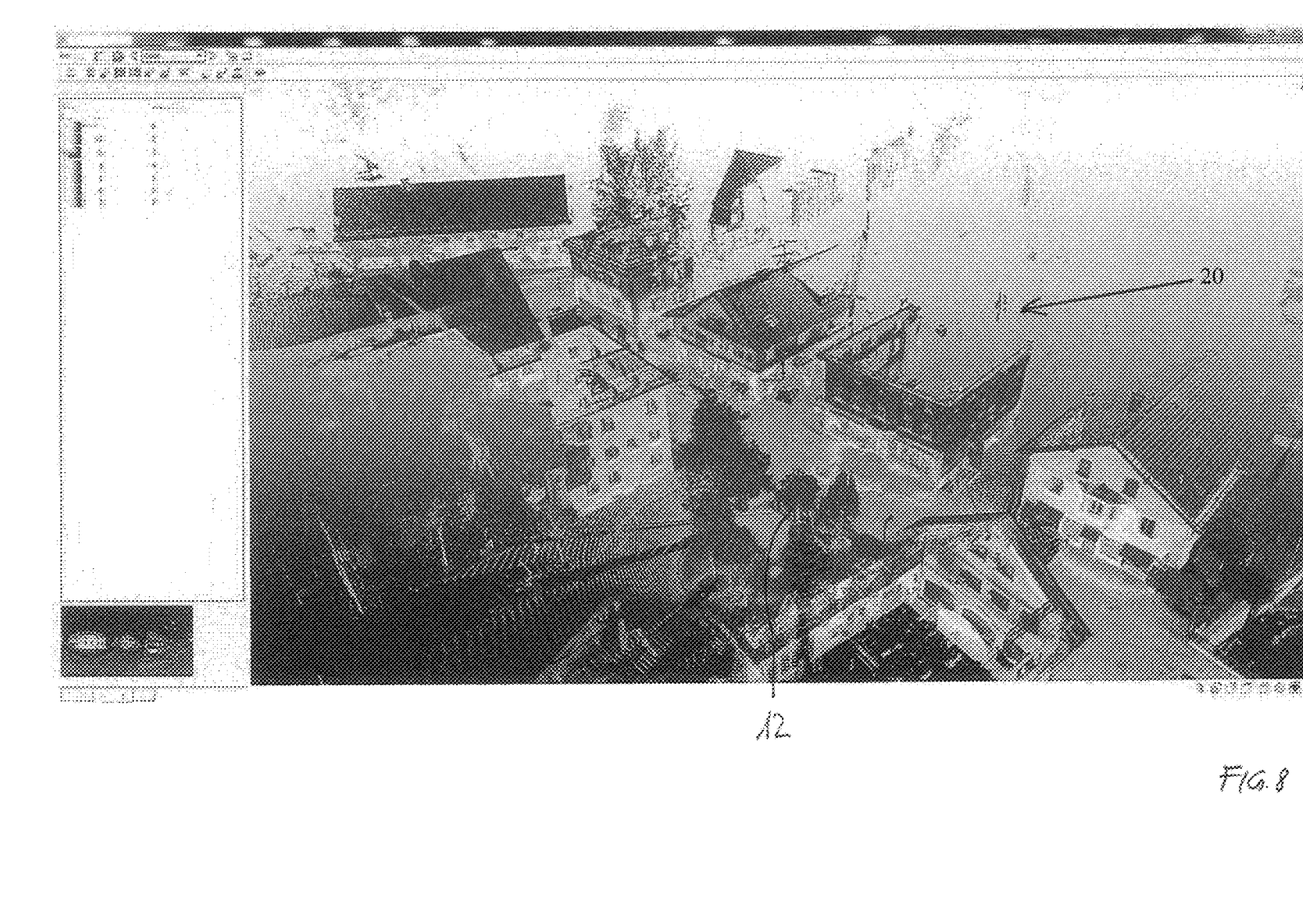
FIG. 8 shows a 3D view of a point cloud including assigned thermographic data of a residential area for analyzing the heat insulation.

FIGS. 8 and 9 illustrate different 3D views of plural merged point clouds including assigned thermographic data for analyzing the heat insulation of a residential area. For the purpose of better comprehension, in FIG. 8 the viewing direction of FIG. 9 onto the residential area is indicated by an arrow 20 and, vice versa, in FIG. 9 the viewing direction of FIG. 8 onto the residential area is indicated by an arrow 20. Accordingly, domains which are shown to be transparent to the viewer are standing out. By way of example, some roofs of the houses are mentioned. In this case, too, areas shaded during the scanning/capturing operation are concerned which consequently cannot show any pixels or thermographic data. In order to minimize said shaded areas at least with respect to the façades, the laser scanner 1 was positioned at different locations 12 for the scanning/capturing operation. In FIG. 8 only one of the locations 12 is evident because of the chosen view. At each location 12 the area not adapted to be scanned/captured by the laser scanner 1 stands out as a circular blue area having a grey margin.

The afore-mentioned transparent areas seemingly permit to look into the interior of the houses. However, there are merely visible the pixels of the façades linked with the thermographic data. It would of course be possible, however, to provide additional locations of the laser scanner 1 inside the houses and thus to illustrate a change of radiation from the inner walls toward the façade and hence to allow drawing conclusions about thermal flows.

Disclosed is a laser scanner designed to include a thermographic camera.

Also disclosed is a method for capturing thermographic data using a laser scanner of this type.

LIST OF REFERENCE NUMERALS

1 laser scanner
2 housing
4 rotary head
6 infrared camera, thermographic camera
8 platform
10 structural inhomogeneity
12 location
14 carrier
A vertical axis of rotation
B axis
C horizontal axis

The invention claimed is:

1. A laser scanner comprising
a rotary head which is held rotatably on a housing which in turn is rotatable about an axis of rotation,
wherein measuring optics are arranged in the rotary head in order to direct a measuring beam emitted by a transmitter to a measuring object or a beam reflected by the latter to a receiver, by means for indirect or direct contactless capturing of thermographic data of the measuring object to be surveyed and by means for assigning said thermographic data to pixels of a 3D scan, and
wherein a viewing direction of the means for indirect or direct contactless capturing of thermographic data can be adjusted step by step in a direction vertically upward or a direction vertically downward to the base.

2. The laser scanner according to claim 1, wherein the means is a thermographic infrared camera, which is supported on the housing of the laser scanner.

3. The laser scanner according to claim 1, wherein the means is a thermographic infrared camera, which is supported on a carrier of the laser scanner.

4. The laser scanner according to claim 1 comprising a platform via which the means is adapted to be pivoted about an axis extending transversely to the axis of rotation.

5. The laser scanner according to claim 4, wherein the means for capturing thermographic data and the platform are controllable via a controller of the laser scanner.

6. The laser scanner according to claim 1, comprising a controller or control unit via which at least one internal and/or external calibration of the means for capturing thermographic data is/are performed in an automated manner.

7. A method for capturing thermographic data of a measuring object to be scanned using a laser scanner according to claim 1, comprising the steps of:
scanning the measuring object for generating 3D data of the measuring object (3D scan);
recording thermographic data of the measuring object using the means of capturing thermographic data by stepwise pivoting of the laser scanner about the axis of rotation and stepwise adjusting the viewing direction of the means for capturing thermographic data so as to obtain an approximately spherical 360° thermographic picture of the measuring object, and
assigning the thermographic data to the 3D data of the measuring object.

8. The method according to claim 7, wherein the means for capturing thermographic data is calibrated, wherein an internal calibration and an external calibration are performed.

9. The method according to claim 8, wherein the internal calibration is performed by means of a defined calibrating object that is thermographically visible.

10. The method according to claim 8, wherein the external calibration, i.e. the detection of the position of the means for capturing thermographic data is performed by means of target boards which are visible both in the thermal picture and in the 3D scan so that an offset between optical axes of the 3D scanner and the means for capturing thermographic data can be calculated and based thereon required transformations in picture evaluation can be determined.

11. The method according to claim 8, wherein at least one of the calibrations is carried out in an automated manner.

12. The method according to claim 7, wherein a lens of the thermographic camera is adjusted to a hyper-focal distance.

13. The method according to claim 7 comprising the step of
   correcting distortions of the thermographic data of the measuring object, and
   combining or merging the thermographic data into a panoramic picture.

14. The method according to claim 7, wherein, before the step of
   recording thermographic data, a step of
   heating or cooling the measuring object, at least in portions, is taken.

15. The method according to claim 7 comprising a step of
   determining a damaged spot and/or humid spot at or in a structure of the measuring object in dependence on the 3D scan and the assigned thermographic data.

* * * * *